(12) United States Patent
Faccin et al.

(10) Patent No.: US 8,081,759 B2
(45) Date of Patent: Dec. 20, 2011

(54) APPARATUS, AND AN ASSOCIATED METHOD, FOR FACILITATING FAST TRANSITION IN A NETWORK SYSTEM

(75) Inventors: Stefano Faccin, Dallas, TX (US); Jonathan P. Edney, Cambridgeshire (GB)

(73) Assignee: Nokia Corporation, Espoo (FI)

( * ) Notice: Subject to any disclaimer, the term of this patent is extended or adjusted under 35 U.S.C. 154(b) by 1041 days.

(21) Appl. No.: 11/229,338

(22) Filed: Sep. 15, 2005

(65) Prior Publication Data

US 2006/0067526 A1    Mar. 30, 2006

Related U.S. Application Data

(60) Provisional application No. 60/609,943, filed on Sep. 15, 2004, provisional application No. 60/609,944, filed on Sep. 15, 2004.

(51) Int. Cl.
*H04K 1/00*    (2006.01)

(52) U.S. Cl. ........ 380/273; 380/247; 380/248; 380/249; 713/168

(58) Field of Classification Search .................... 380/46, 380/263, 268, 272, 273, 247–249; 455/432.1, 455/436, 411, 437; 713/168
See application file for complete search history.

(56) References Cited

U.S. PATENT DOCUMENTS

| | | | |
|---|---|---|---|
| 6,094,575 A | 7/2000 | Anderson et al. | 455/422 |
| 6,850,503 B2* | 2/2005 | Dorenbosch et al. | 370/331 |
| 6,944,452 B2 | 9/2005 | Coskun et al. | 455/436 |
| 7,047,009 B2 | 5/2006 | Laroia et al. | 455/437 |
| 7,212,821 B2 | 5/2007 | Laroia et al. | 455/437 |
| 7,275,157 B2* | 9/2007 | Cam Winget | 713/168 |
| 7,350,077 B2* | 3/2008 | Meier et al. | 713/171 |
| 2002/0077078 A1* | 6/2002 | Antti | 455/410 |
| 2002/0082018 A1 | 6/2002 | Coskun et al. | 455/439 |
| 2003/0112766 A1 | 6/2003 | Riedel et al. | 370/252 |
| 2003/0161284 A1 | 8/2003 | Chen | 370/331 |
| 2003/0214905 A1* | 11/2003 | Solomon et al. | 370/229 |
| 2004/0006705 A1* | 1/2004 | Walker | 713/200 |
| 2004/0103282 A1 | 5/2004 | Meier et al. | |
| 2004/0184422 A1* | 9/2004 | Shaheen | 370/331 |

(Continued)

FOREIGN PATENT DOCUMENTS

AU    2001-276315 B2    3/2003

(Continued)

OTHER PUBLICATIONS

International Search Report and Written Opinion of the international Searching Authority mailed Jan. 27, 2006 for PCT Application No. PCT/US2005/033350, 13 pages.

(Continued)

*Primary Examiner* — Edward Zee
*Assistant Examiner* — Chi Nguy
(74) *Attorney, Agent, or Firm* — Harrington & Smith

(57) ABSTRACT

An apparatus, system, computer-readable medium, and method to facilitate quick transition of communications of a mobile station between network stations of a radio communication system, such as a WLAN operable to a variant of an IEEE 802 operating specification, is provided. Implementations of embodiments described herein reduce the transition duration by a pre-keying mechanism that performs authentication procedures prior to commencement of reassociation procedures. In other embodiments, a mobile station is allowed to select whether to perform pre-keying processes over an air interface with a target transition access point or whether to perform the pre-keying processes over a distribution system.

26 Claims, 12 Drawing Sheets

U.S. PATENT DOCUMENTS

| | | | |
|---|---|---|---|
| 2004/0240414 A1 | 12/2004 | Fan et al. | 370/332 |
| 2004/0243846 A1* | 12/2004 | Aboba et al. | 713/201 |
| 2005/0032506 A1* | 2/2005 | Walker | 455/411 |
| 2005/0037756 A1 | 2/2005 | Yaguchi et al. | 455/436 |
| 2005/0124344 A1 | 6/2005 | Laroia et al. | 455/436 |
| 2005/0124345 A1 | 6/2005 | Laroia et al. | 455/437 |
| 2006/0079241 A1 | 4/2006 | Faccin et al. | 455/450 |
| 2006/0111103 A1* | 5/2006 | Jeong et al. | 455/434 |
| 2006/0199588 A1 | 9/2006 | Gao et al. | 455/442 |

FOREIGN PATENT DOCUMENTS

| | | | |
|---|---|---|---|
| EP | 1 185 031 A2 | 3/2002 | |
| EP | 1 439 667 A2 | 7/2004 | |
| JP | 2004-208073 | 7/2004 | |
| JP | 2007513569 | 5/2007 | |
| JP | 2008/271601 A | 11/2008 | |
| WO | WO-02/076060 A2 | 9/2002 | |
| WO | WO-03/009624 A1 | 1/2003 | |
| WO | WO-03/032602 A2 | 4/2003 | |
| WO | WO-2005/062658 A1 | 7/2005 | |

OTHER PUBLICATIONS

Aboda, Bernard, "IEEE 802.1X Pre-Authentication", Jul. 11, 2002, 10 pages.

Altunbasak, Hayriye, et al., "Alternative Pair-Wise Key Exchange Protocols for Robust Security Networks (IEEE 802.11i) in Wireless LANs", IEEE, Apr. 29, 2004, pp. 3-9.

International Search Report and Written Opinion of the International Searching Authority mailed Jan. 26, 2006 for PCT Application No. PCT/US2005/032944, 17 pages.

Edney, Jon, et al, "IPEE P802.11 Wireless Lans/TAP-JIT Resources Pre-Allocation", doc. IEEE 802.11-05/0228r0, Mar. 15, 2005, 11 pages.

Marshall, Bill, "IEEE P802.11 Wireless Lans/Introducing 11r-D0. 00", doc IEEE 802.11-05/0538r00, Jul. 2005, 45 pages.

Mouly-Pautet, "The GSM system for mobile communications", XP-002194765, 1992, pp. 366-384.

* cited by examiner

APPARATUS, AND AN ASSOCIATED METHOD, FOR FACILITATING FAST TRANSITION IN A NETWORK SYSTEM

RELATED APPLICATION DATA

This patent application claims the benefit of provisional U.S. Patent Application Ser. No. 60/609,943, filed Sep. 15, 2004, and provisional U.S. Patent Application Ser. No. 60/609,944, filed Sep. 15, 2004.

FIELD OF THE INVENTION

The present invention relates to network technologies and, more particularly, to mechanisms for facilitating transition of mobile unit communications between network stations of a radio communication system. Still more particularly, the present invention relates to an apparatus, method, and computer-readable medium for pre-keying and reassociation processes that facilitate fast transitions between access points in a Wireless Local Area Network (WLAN).

BACKGROUND

Advancements in communication technologies have resulted in the development, and subsequent deployment, of many varied types of communication systems. Communication systems are used to communicate data pursuant to any of many different types of communication services. A communication system is formed by a set of communication stations between which data is communicated. At least one of the communication stations of the set forms a sending station and at least another of the communication stations of the set forms a receiving station. The sending and receiving stations are interconnected by way of a communication channel, and the data communicated by the sending station is delivered to the receiving station by way of the communication channel.

A radio communication system is a type of communication system in which the communication channel that interconnects the communication stations and upon which data is communicated is formed of a radio channel. A radio channel is defined upon a radio link that comprises a portion of the electromagnetic spectrum. When radio channels are used to communicate data between communication stations, the communication stations need not be interconnected by wireline, i.e., fixed, connections. As the positioning of the communication stations of a radio communication system does not depend upon the availability of wireline connections to interconnect the communication stations, the communication stations are positionable at locations, and in manners, that would not be possible in a wireline communication system. Communications are possible, therefore, through the use of a radio communication system at, and between, locations at which wireline communication stations could not be positioned and used. Additionally, a radio communication system is implementable as a mobile communication system in which one, or more, of the communication stations between which data is communicated is provided with communication mobility.

A cellular communication system is an exemplary type of mobile radio communication system. In a cellular communication system, a network infrastructure is installed throughout a geographical area throughout which communications are to be permitted. The network infrastructure includes, typically, a plurality of spaced-apart, fixed-site transceivers, each of which defines a cell. The positioning of the fixed-site transceivers is selected, generally, so that the cells partially overlap in manners so that, collectively, the cells encompass the entire geographical area. Radio transceivers, typically both portable and mobile, are used to communicate with the fixed-site transceivers. The portable transceivers generally communicate with the fixed-site transceiver in whose cell that the portable transceiver is positioned. As a portable transceiver travels between cells defined by different fixed-site transceivers, a communication handoff is performed to permit continued communications of, and with, the portable transceiver.

Other types of radio communication systems have been developed and deployed that exhibit some of the characteristics of cellular communication systems. Wireless local area networks (WLANs), for example, exhibit some of the characteristics of cellular communication systems. A wireless local area network includes a network part, also typically including a plurality of transceivers that each define cells, or coverage areas otherwise-defined. A transceiver, also referred to herein as a mobile station (STA) and mobile unit (MU), operable in a wireless local area network communicates with a network part transceiver in whose coverage area the STA is positioned. Hand-offs of communication between successive network part transceivers permits continued communications as the STA moves between coverage areas defined by different network part transceivers.

In a communication hand-off, herein also referred to as a communication transition, it is desirable that the hand-off, or transition, between network part transceivers is carried out quickly to minimize communication service interruptions during the communication hand-off. However, various signaling is required pursuant to the transition.

Intermittent connectivity losses occur due to transitioning of a STA between different network part transceivers. When a STA releases a connection with one network part transceiver and establishes another new connection with different network part transceiver, there is a loss of connectivity that occurs during the transition. The loss of connectivity may result in a communication loss, such as lost packets. In various service scenarios, the connectivity loss is highly undesirable and may adversely effect the communication services provided to the STA. For example, when the STA is engaged in real-time transmission of voice data, such as while running telephony or other voice streaming services, undesirable audible effects may result. In other cases, a voice connection may be lost.

Thus, a need exists to reduce the duration of a connectivity loss experienced during transition of mobile station communications when transitioning from one network part transceiver to another network part transceiver.

SUMMARY

Embodiments of the present invention advantageously provide an apparatus, associated method, and computer-readable medium to facilitate quick transition of communications of a mobile unit between network stations of a radio communication system, such as a WLAN operable to a variant of an IEEE 802 operating specification. Implementations of embodiments described herein reduce the transition duration by a pre-keying mechanism that performs authentication procedures prior to commencement of reassociation procedures. In other embodiments, a mobile station is allowed to select whether to perform pre-keying processes over an air interface with a target transition access point or whether to perform the pre-keying processes over a distribution system.

BRIEF DESCRIPTION OF THE DRAWINGS

Aspects of the present disclosure are best understood from the following detailed description when read with the accompanying figures.

DETAILED DESCRIPTION

Figure 1:
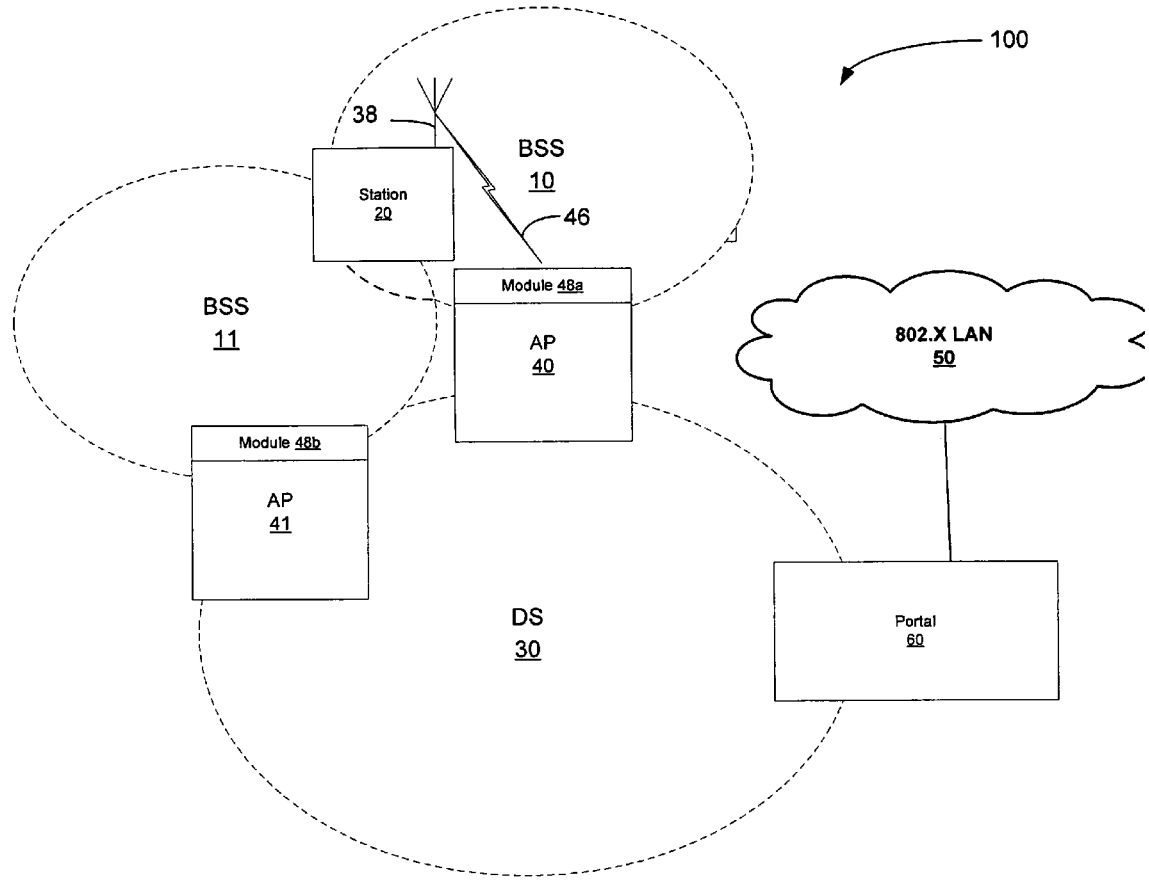
FIG. 1 is a simplified block diagram of an exemplary network system in which embodiments of the present invention may be implemented for advantage.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1 is a simplified block diagram of an exemplary network system 100 in which embodiments of the present invention may be implemented for advantage. System 100 is an example of a shared resource network, such as a wireless local area network (WLAN) conforming to an IEEE 802.11 standards variant.

In the illustrative example, system 100 comprises two basic service sets (BSSs) 10 and 11 although any number of BSSs may be included in system 100. BSSs 10 and 11 provide respective coverage areas, or cells, in which WLAN stations (STAs), such as mobile STA 20, may communicate via a wireless medium with one another or with other communication or computational devices in other external networks that interface with system 100. BSSs 10 and 11 are communicatively interconnected by a distribution system (DS) 30. DS 30 enables mobile device support by providing requisite logical services for handling address to destination mapping and integration of multiple BSSs. Each of BSSs 10 and 11 include a respective access point (AP) 40 and 41 that provides access to DS 30. DS 30 provided by BSSs 10 and 11 and APs 40 and 41 facilitate creation of a wireless network of arbitrary size and complexity, and the collection of BSSs 10-11 and DS 30 is commonly referred to as an extended service set network. Logical integration between system 100 and non-IEEE 802.11 LANs, e.g., LAN 50, may be provided by a portal 60. Various other configurations of network 100 are possible. For example, BSSs 10 and 11 may partially overlap (as illustratively shown) or may be collocated. Each of BSSs 10 and 11 are assigned a respective basic service set identifier (BSSID) that uniquely identifies BSSs 10 and 11 within system 100.

DS 30 is provided or maintains association data to identify which AP 4041 to access for a given STA. This information is provided by a STA-AP association service that may be invoked by a STA. Prior to a STA sending data in system 100 by way of an AP, the STA is first associated with an AP. An AP with which a station is associated is referred to herein as a current AP. The association service maps a STA to an AP. The DS may then utilize the STA and AP mapping to perform message distribution services. A STA is only associated with one AP at a particular time thereby enabling DS 30 to determine which AP is currently serving the STA.

System 100 provides for communication transitions of communications by, and with, a STA between access points, such as when a mobile station travels between overlapping coverage areas of different ones of the access points. Communication transitions are sometimes further effectuated for other reasons to facilitate communication operations in a network. Transition capabilities that allow a STA to roam among APs are provided by a reassociation service of the DS that is invoked by a STA. A transition occurs when the association of a STA with an AP is changed to an association with the STA and another AP and is carried out by execution of the reassociation service and includes a remapping of the STA to the AP to which the STA has transitioned. To terminate an association, a disassociation service may be invoked by a STA or AP. Access in system 100 to STAs is provided by authentication services.

Authentication services are used by STAs to establish their identity to stations with which communications may be made. Association may be established if the level of authentication between two station is acceptable by both stations. Additionally, system 100 may support Shared Key authentication. A Shared Key authentication mechanism facilitates demonstration of identify by knowledge of a shared and secret encryption key.

A deauthentication service may be invoked to terminate an existing authentication. Because authentication must be performed to make an association, deauthentication with a network entity results in disassociation if an association has be previously made with the network entity.

Pursuant to communication transitions, various signaling operations are performed and various decisions must be made to perform a transition. The transition process sometimes consumes hundreds of milliseconds of time. During the transition procedure, communication interruptions or data loss may occur, deleteriously effecting communications pursuant to a communication session of the mobile station. The present invention provides mechanisms for a fast transition between APs. APs adapted to carry out fast transitions in accordance with embodiments described herein may be referred to as fast BSS transition enabled access points (TAPs), and mobile stations adapted to carry out fast transitions in accordance with embodiments described herein may be referred to as fast transition enabled stations (TSTAs), or simply stations (STAs).

Conventional implementations for providing security in system 100 include Pairwise key mechanisms to provide security for unicast traffic. To carry out the pairwise key mechanisms, a four way handshake is performed after completion of an authentication process. Thus, the duration of a key establishment procedure includes both the duration of a reassociation procedure and the duration of an authentication procedure, e.g., a four way handshake. Connectivity losses may occur during the transition duration resulting in adverse or undesirable services during the transition.

Figure 2:
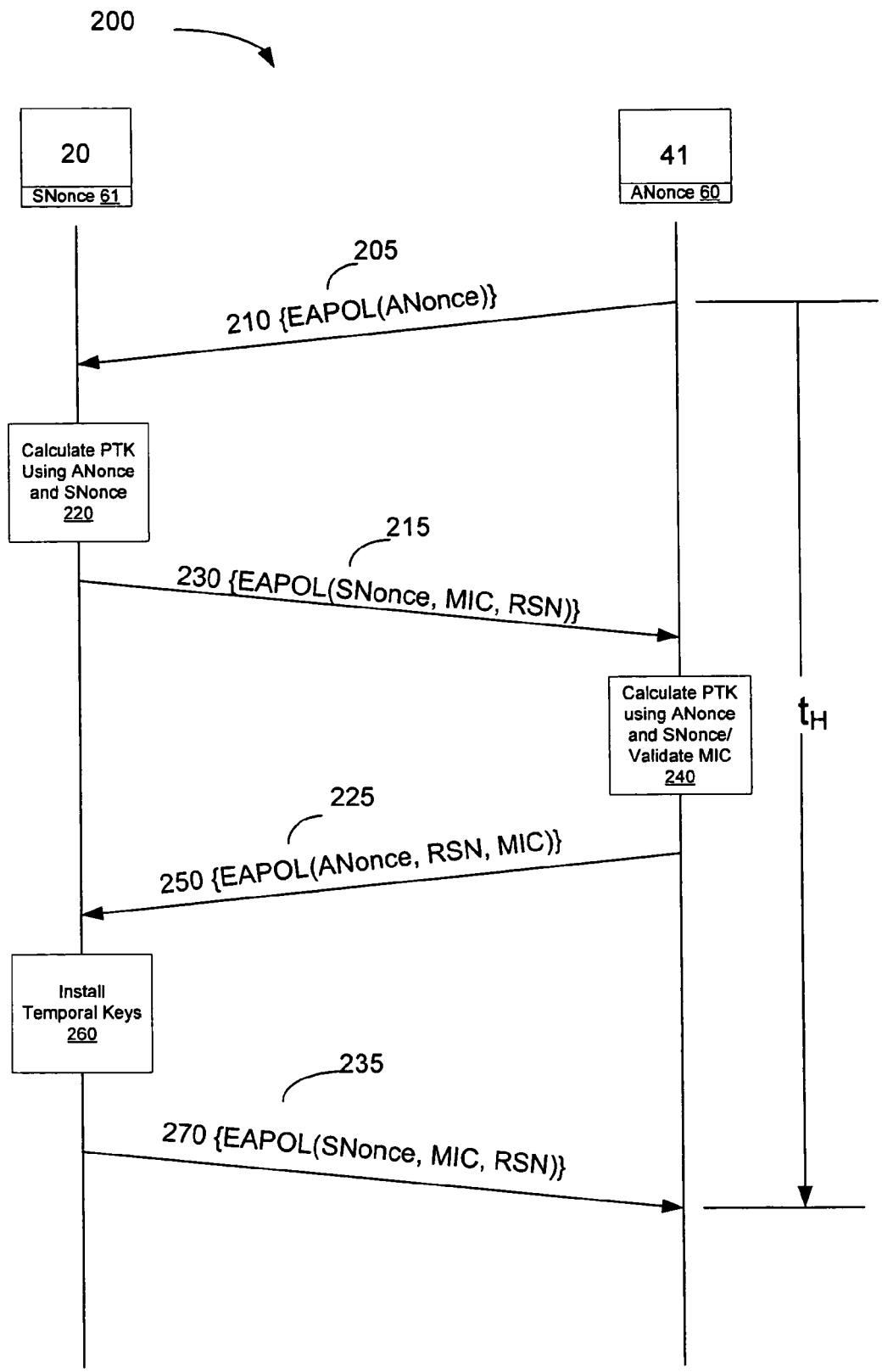
FIG. 2 is a diagrammatic representation of a signaling exchange between a mobile station and an access point for performing a four way handshake as is conventional.

FIG. 2 is a diagrammatic representation of a signaling exchange 200 between a STA and an AP for performing a four way handshake as is conventional. The four way handshake process depicted in FIG. 2 is performed after issue of a reassociation request by a STA and receipt, by the STA, of a reassociation response from the target or candidate transition AP. Station 20 attempting authentication with AP 41 has a Supplicant nonce (SNonce) of a random value, and AP 41 has an Authenticator Nonce (ANonce) of a random value. A Nonce is a member of a set of numbers where no two values are the same. A nonce may be generated, for example, by a pseudo random number algorithm if the repeat sequence is greater than the set size. In a preferred implementation, a Nonce may comprise a value of a value set comprising sequential values. Various Nonces may be used to implement embodiments described herein, including SNonce, ANonce, a Supplicant Transition Nonce (STNonce), and an authenticator transition Nonce (ATNonce). The four way handshake is initiated by AP 41 sending an Extensible Authentication Protocol over LANs (EAPOL)-Key frame 205 that includes ANonce 51 (step 210). STA 20, upon receipt of EAPOL-Key frame 205, calculates or otherwise derives a pairwise transient key (PTK) from ANonce 60 and SNonce 61 (step 220). STA 20 then sends an EAPOL-Key frame 215 to AP 41 (step 230). EAPOL-Key frame 215 includes SNonce 61 and may include other information such as a robust security network (RSN) information element (or content thereof) defining authentication and pairwise ciphering information obtained by the STA from a reassociation request frame and a message integrity code (MIC). AP 41 then calculates or otherwise derives PTK from ANonce 60 and the SNonce value read from EAPOL-Key frame 215 and validates the MIC provided thereto by STA 20 (step 240). AP 41 then sends to STA 20 an EAPOL-Key frame 225 that includes the ANonce, the RSN information element from the AP's Beacon or probe response messages, and a MIC (step 250). Other information, such as an indication to STA 20 of whether to install temporal keys and encapsulated GTK may be included in frame 225. In the event that the handshake is successful, STA 20 installs the temporal keys (step 260), and STA 20 returns an EAPOL-Key frame 235 to AP 41 to confirm installation of the temporal keys (step 270). The four way handshake consumes a time tH and thus introduces a corresponding delay in a handover or transition process that may disadvantageously effect communication service, particularly real-time services such as voice, video or other streaming media services.

Figure 3A:
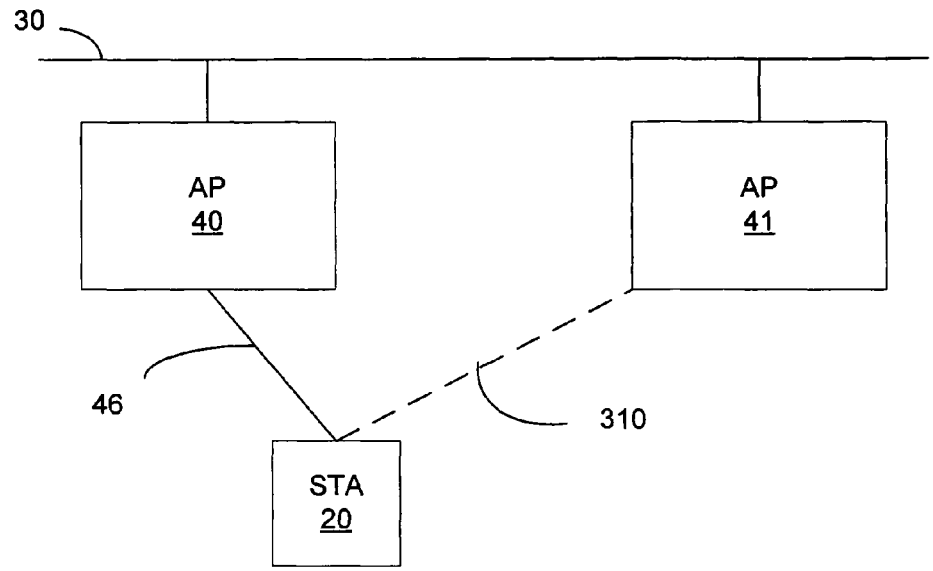
FIG. 3A is a diagrammatic illustration of a mobile station detecting a candidate access point for transition thereto as is conventional.
Figure 3B:
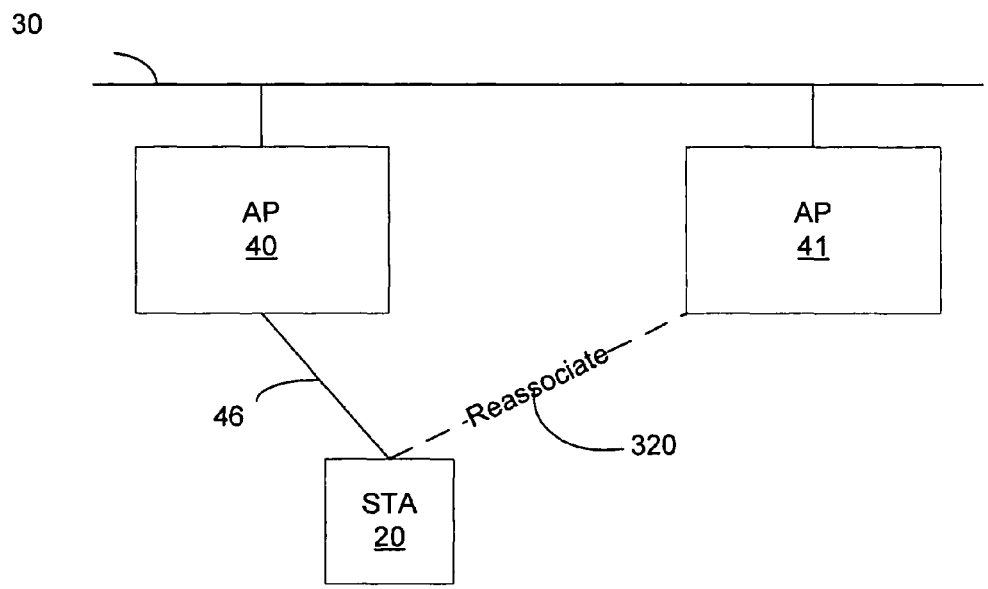
FIG. 3B is a diagrammatic illustration of a mobile station performing a reassociation process with an access point as is conventional.
Figure 3C:
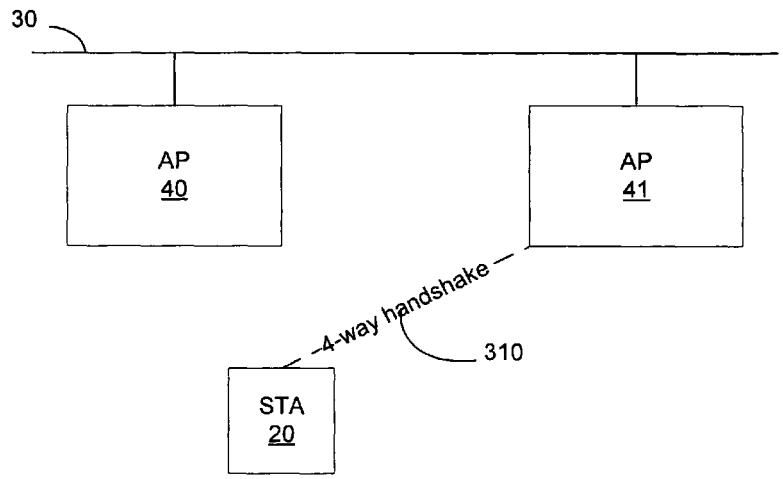
FIG. 3C is a diagrammatic illustration of an authentication procedure comprising a four way handshake between a mobile station and an access point subsequent to a reassociation procedure therebetween as is conventional.

FIG. 3A is a diagrammatic illustration of a STA detecting a candidate AP for transition thereto as is conventional. In the illustrative example, STA 20 is associated with current AP 40 and is communicatively coupled thereto by way of radio link 46. STA 20 may identify or discover AP 41, e.g., by detection of a beacon signal 310 broadcast by AP 41. In the event that STA 20 desires to perform a transition to AP 41, a reassociation procedure is then performed with AP 41 as shown by the diagrammatic illustration of FIG. 3B showing STA 20 performing a reassociation process with AP 41. A medium access control (MAC) link 320 is established with AP 41, and a reassociation procedure is carried out between STA 20 and AP 41. When the reassociation is completed, link 46 between STA 20 and AP 40 may be released, and STA 20 may then commence with authentication or security procedures, e.g., a four way handshake for establishing installation of temporal keys as shown by the diagrammatic illustration of FIG. 3C of a STA performing a four way handshake with AP 41 to which the STA has completed a reassociation procedure. Secure communications may then commence between STA 20 and AP 41 after completion of the handshake. The cumulative duration of the reassociation and four way handshake may disadvantageously effect communications or services that were being performed by STA 20 prior to invocation of the transition procedure. For example, voice services, video service, or other streaming applications or services may experience unacceptable or undesirable interruptions or may be dropped due to the communication delay that may be experienced by STA 20 during the transition.

Figure 4:
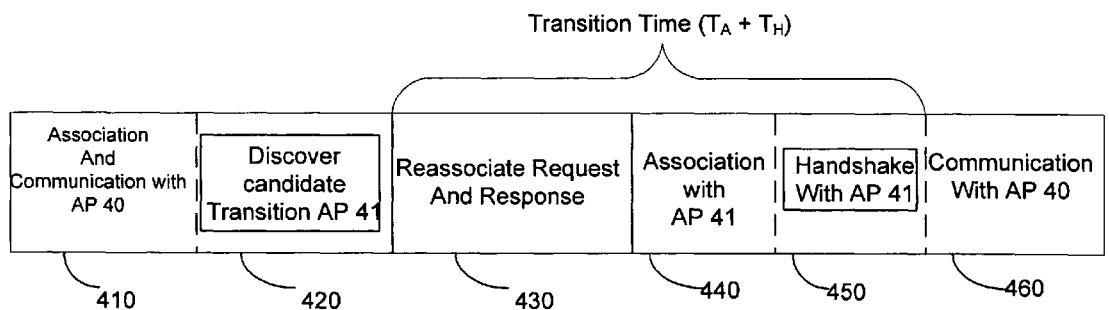
FIG. 4 is a diagrammatic representation of message timing for a transition procedure as conventionally performed as described in FIGS. 3A-3C.

FIG. 4 is a diagrammatic representation of message timing for a transition procedure as conventionally performed as described above in FIGS. 3A-3C. STA 20 is associated and communicatively coupled with AP 40 (step 410). STA 20 may then discover a candidate or potential AP 41 with which STA 20 may elect to attempt a transition (step 420). A reassociation process is then invoked by STA 20 and includes conveying a reassociation request to candidate transition AP 41 and awaiting receipt of a reassociation response returned thereto by candidate transition AP 41 (step 430). An association with AP 41 is then established (step 440). Once STA 20 is associated with AP 41, STA 20 may invoke a four way handshake process with AP 41 (step 450). Upon completion of the handshake procedure, STA 20 may commence with secured communications in system 100 by way of AP 41 (step 460). Notably, the transition time consumed for handover of communications from AP 40 to AP 41 extends from the invocation of the reassociation procedure until completion of the handshake in the event that STA 20 is engaged in secure communication sessions in system 100. The transition time thus comprises the cumulative duration of the reassociation process time (TA) and the handshake duration (tH).

Embodiments described herein reduce the transition duration by a pre-keying mechanism that performs key establishment procedures prior to commencement of reassociation procedures. Particularly, embodiments described herein provide mechanisms for establishing keys, e.g., a respective pairwise transient key (PTK) at a STA and a candidate AP prior to invocation of a reassociation process. The reassociation process is invoked subsequent to calculation of a PTK by a STA performing a fast transition and an AP with which the STA is performing the fast transition. The fast transition process is facilitated by exchange of parameters in a reassociation request and a reassociation response. In one embodiment, the STA includes in a reassociation request a hash of an authenticator transition nonce (ATNonce) received in a fast transition response supplied to the STA by the candidate transition AP. In a similar manner, the candidate transition AP includes in a reassociation response a hash of a supplicant transition nonce (STNonce) received in a fast transition request supplied to the AP by the STA. Accordingly, PTKs are established and may be used upon completion of a reassociation process without further delays for authentication such as a four way handshake. Thus, transition times are advantageously shortened, and improved communication services may be realized for STAs that roam or transition among APs in system 100.

Figure 5A:
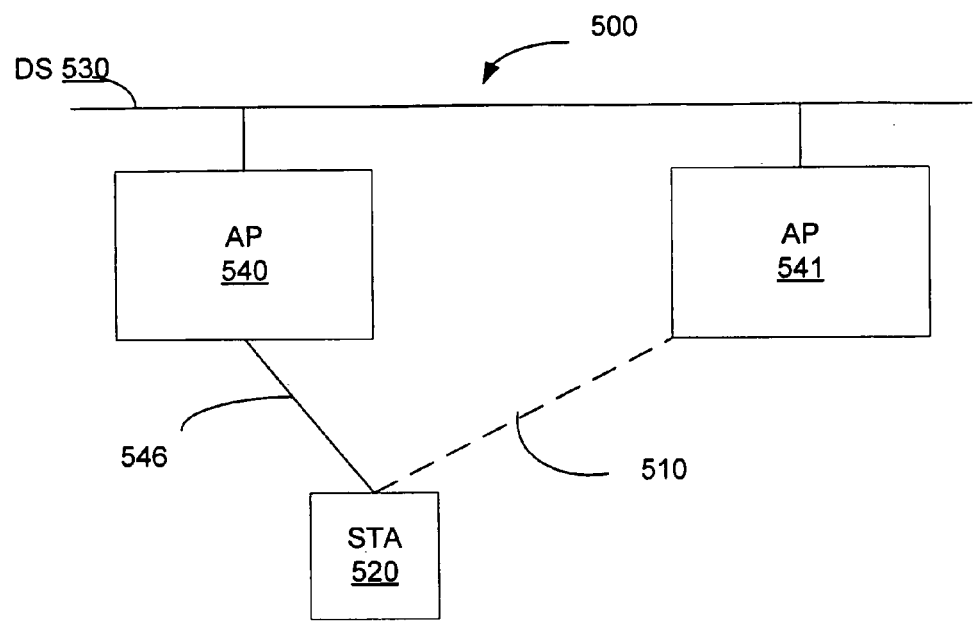
FIG. 5A is a diagrammatic illustration of an embodiment of a mobile station detecting a candidate access point for transition thereto in a network system.
Figure 5B:
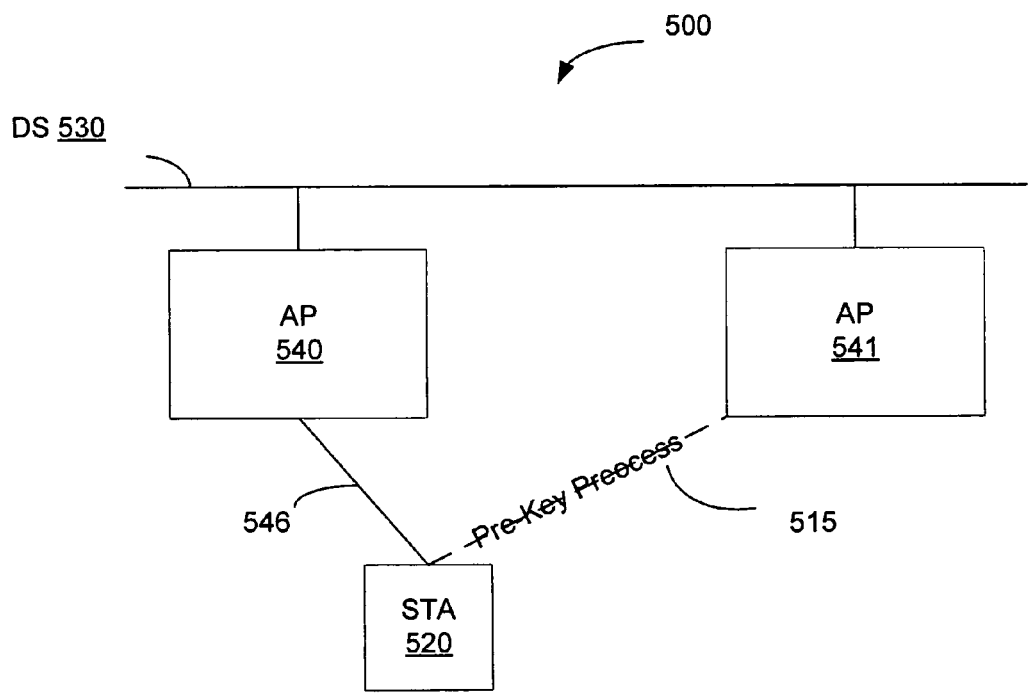
FIG. 5B is a diagrammatic illustration of an embodiment of a pre-keying process that may be performed prior to a reassociation processes that facilitates a fast transition between access points.
Figure 5C:
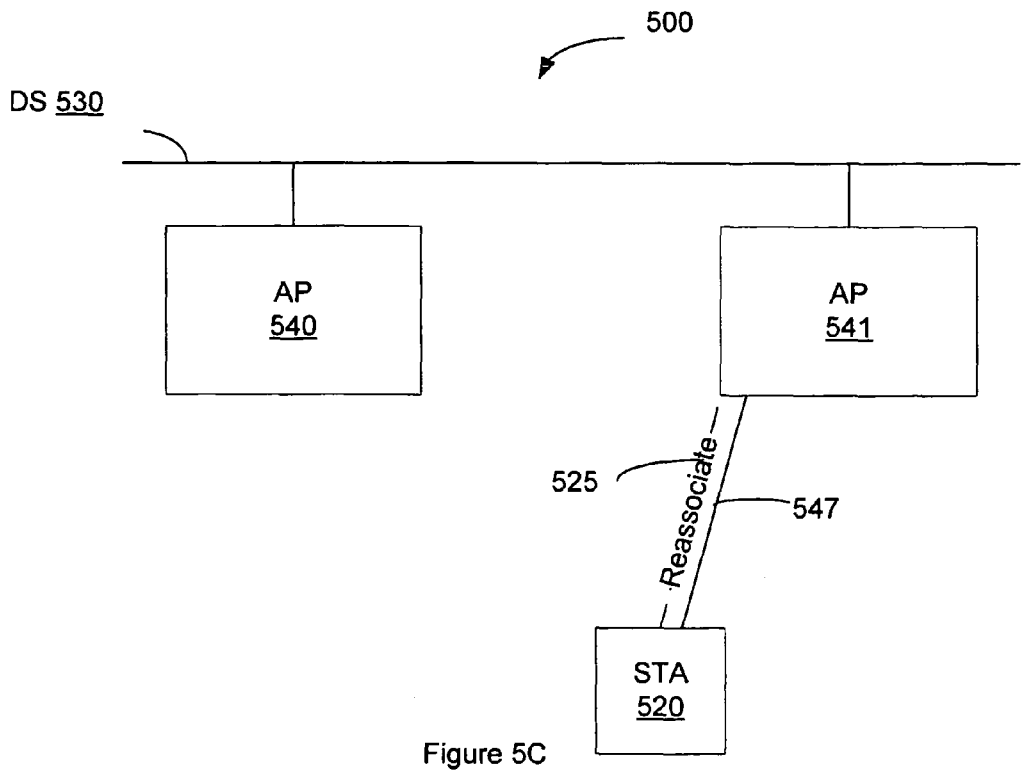
FIG. 5C is a diagrammatic illustration of an embodiment of a reassociation process performed between a mobile station and an access point subsequent to the pre-keying process described in FIG. 5B.

FIG. 5A is a diagrammatic illustration of an embodiment of a STA 520 detecting or discovering a candidate transition AP for transition thereto in a network system 500, such as a WLAN complaint with an 802.11 operating standard variant. In the illustrative example, STA 520, APs 540 and 541, and DS 530 are representative of STAs, APs and a DS adapted for performing fast transitions in accordance with embodiments described herein. In the illustrative example, STA 520 is associated with current AP 540 and is communicatively coupled thereto by way of radio link 546. STA 520 may identify candidate transition AP 541, e.g., by detection of a beacon signal 510 broadcast by AP 541. FIG. 5B shows a diagrammatic illustration of an embodiment of a pre-keying process that may be performed prior to a reassociation process that facilitates a fast transition between APs. STA 520 may invoke a pre-key process with AP 541 by way of one or more links or communication channels 515. In the illustrative example, pre-keying is shown as being carried out directly between STA 520 and a candidate AP 541. Such an implementation is illustrative only and other mechanisms for pre-keying may be implemented as described more fully hereinbelow. In general, the pre-keying process carried out between a STA and a candidate transition AP may provide key establishment procedures, e.g., for establishment of keys such as PTKs for secure communication sessions for use in the event that the STA later executes a transition to the candidate AP. Subsequent to the pre-keying process, STA 520 may invoke a reassociation process with the candidate AP 541 over a MAC link 525 established with AP 541 as shown in the diagrammatic illustration of an embodiment of a reassociation process in FIG. 5C. When the reassociation is completed, a secure communication link 547 between STA 520 and AP 541 may them be established, and STA 20 may then commence secure communications in system 500 by way of AP 541. Advantageously, the transition duration is limited to the reassociation process duration. Accordingly, communication service disruptions encountered during a transition are alleviated or otherwise reduced relative to conventional transition procedures.

Figure 6A:
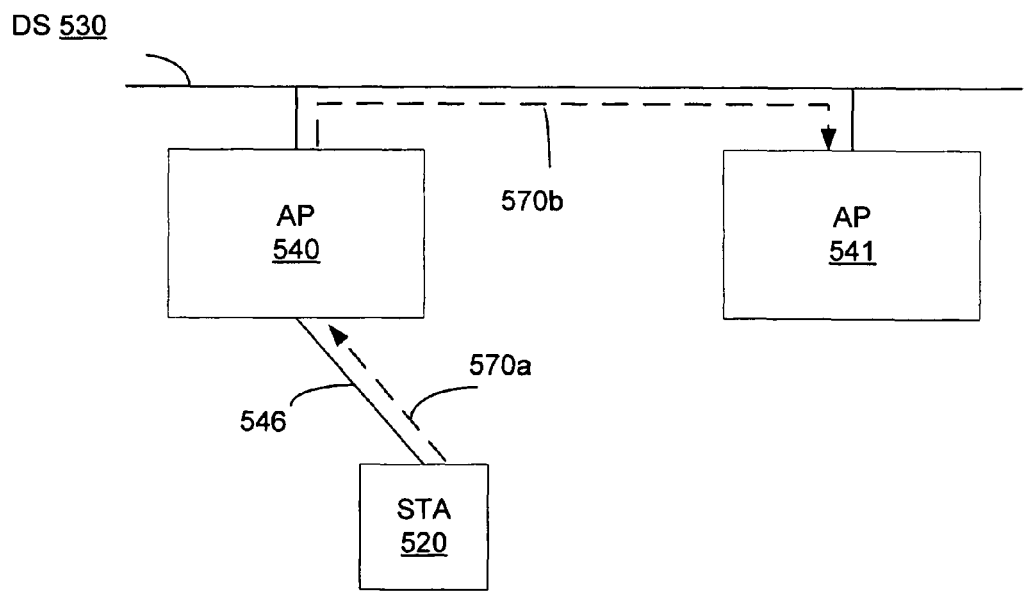
FIG. 6A is a diagrammatic illustration of an embodiment of a pre-keying process that facilitates a fast transition process.

FIG. 6A is a diagrammatic illustration of an embodiment of a pre-keying process that facilitates fast transition. In the illustrative example, STA 520 is associated with AP 540 and is communicatively coupled therewith by way of radio link 546. In this implementation, pre-key processes are carried out by way of DS 530. For example, STA 520 may invoke a pre-key process, and communications for performing the pre-keying process may be made by way of DS 530 and AP 540 with which STA 520 is currently associated. For example, key establishment messages may be transmitted from STA 520 to current AP 540 over a radio link 570a, and AP 540 may act as a relay between STA 520 and candidate AP 541 by transmitting the key establishment messages to AP 541 over link 570b of DS 530. Response messages generated by AP 541 may likewise be transmitted to STA 520 by way of DS 530 to current AP 540, and AP 540 may, in turn, forward the response messages to STA 520. PTKs for secure communications may be generated based on the results of the pre-keying process depicted in FIG. 6A at both STA 520 and candidate transition AP 541. A reassociation process may then commence subsequent to the pre-keying process depicted in FIG. 6A, and the transition duration is advantageously limited to the duration of the reassociation process.

Figure 6B:
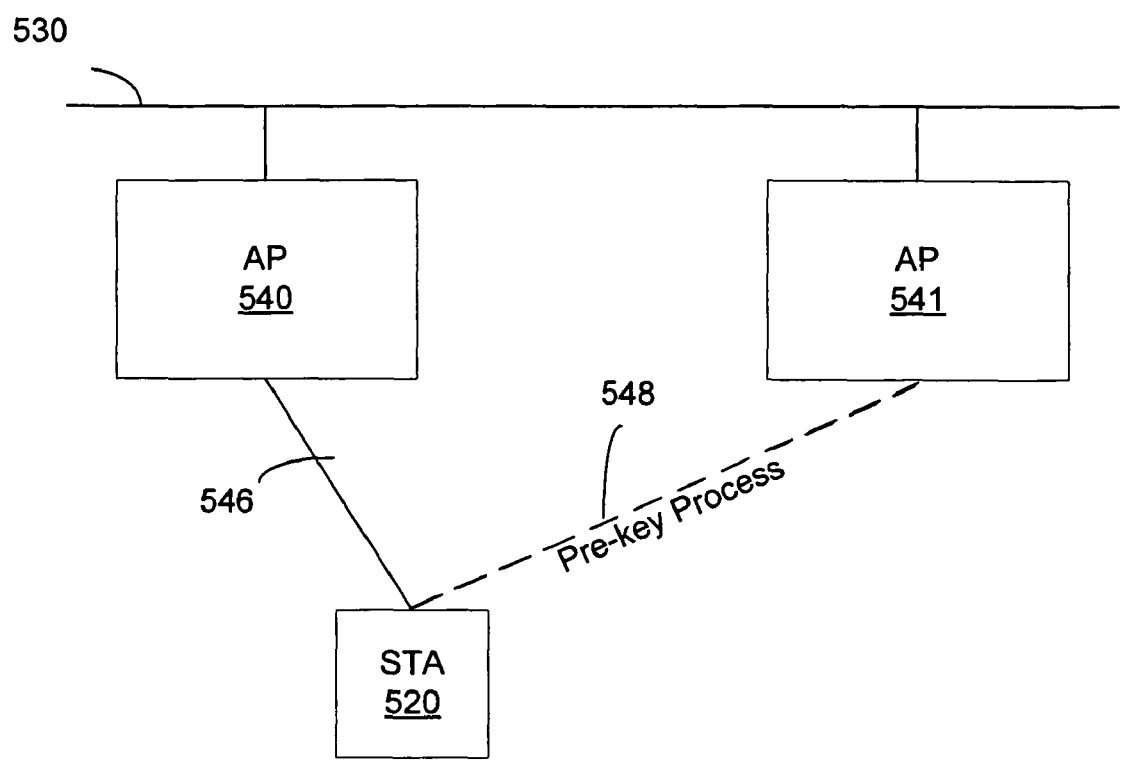
FIG. 6B is a diagrammatic illustration of another embodiment of a pre-keying process that facilitates a fast transition process.

FIG. 6B is a diagrammatic illustration of another embodiment of a pre-keying process that facilitates fast transition. In the illustrative example, STA 520 is associated with AP 540 and is communicatively coupled therewith by way of radio link 546. In this implementation, pre-key processes are carried out on an over-the-air interface, e.g., by way of a radio link 548. For example, STA 520 may invoke a pre-key process, and communications for performing the pre-keying process may be made directly between STA 520 and candidate transition AP 541 over link 548. Response messages generated by AP 541 may likewise be transmitted to STA 520 by way of link 548. PTKs for secure communications may be generated based on the results of the pre-keying process depicted in FIG. 6B at both STA 520 and candidate transition AP 541. A reassociation process may then commence subsequent to the pre-keying process depicted in FIG. 6B, and the transition duration is advantageously limited to the duration of the reassociation process.

In either pre-key process depicted in FIGS. 6A and 6B, after a successful completion of a pre-key process, STA 520 may then invoke a reassociation request with candidate AP 541. In one embodiment, parameters are exchanged between the STA and candidate transition AP during the reassociation process that facilitate mutual verification that each of the STA and candidate transition AP have current keys for engaging in secure communications. Accordingly, the transition time consumed for handover of communications between a current AP 540 and a transition AP 541 is advantageously reduced to the duration of the reassociation process.

Figure 7A:
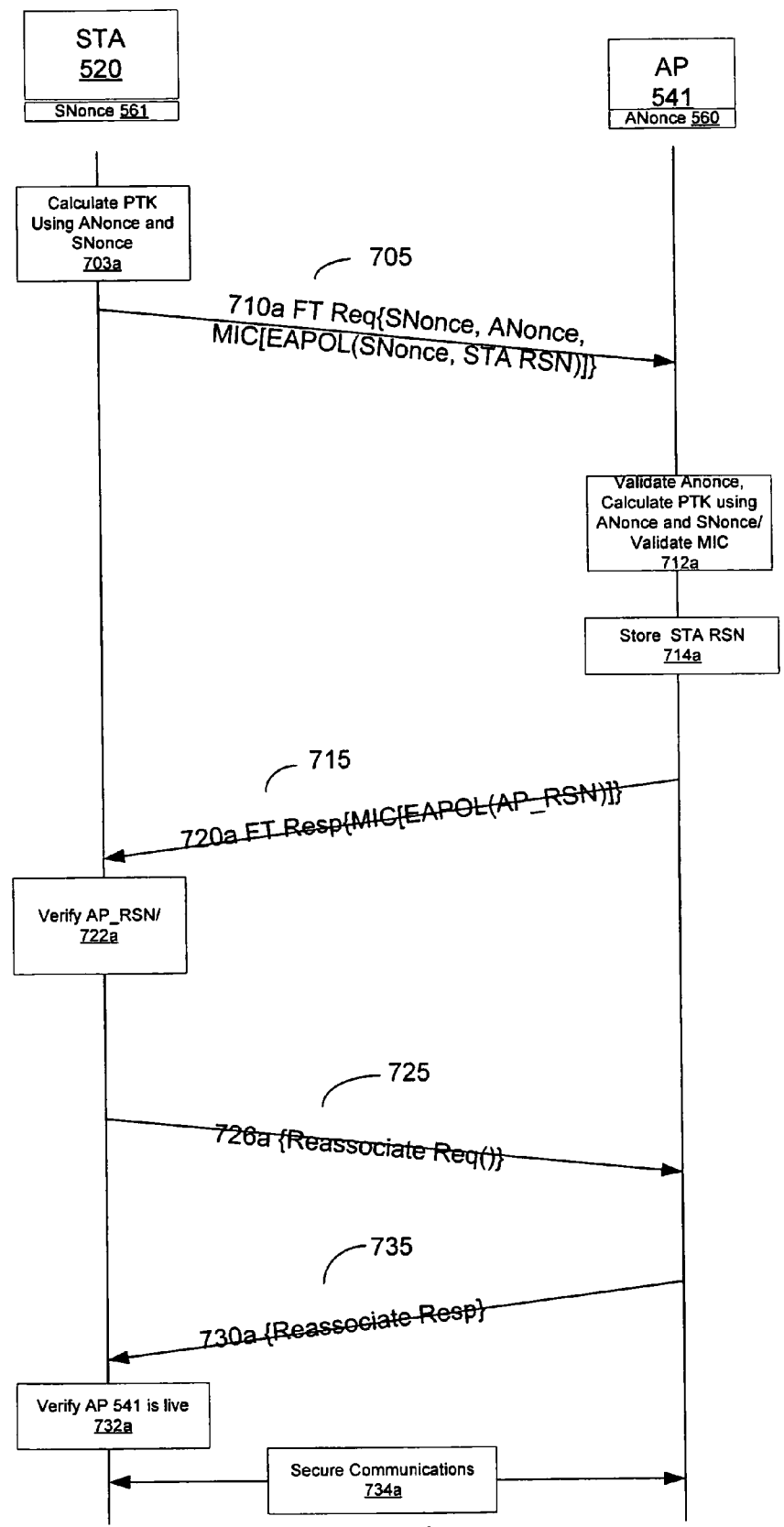
FIG. 7A is a diagrammatic illustration of an embodiment of a signaling exchange between a mobile station and a transition access point for performing a pre-key process that facilitates fast transition between a current access point and the transition access point.

FIG. 7A is a diagrammatic representation of an embodiment of a signaling exchange 700 between a STA 520 and a candidate or target transition AP 541 for performing a pre-key process on an over-the-air interface that facilitates fast BSS transition between a current AP and a target AP in a WLAN. The signaling exchange depicted shows functional steps of a fast transition (FT) routine that facilitates fast transition of a station from a current AP to a candidate or target AP. The FT routine may be invoked by a STA when the STA is associated with a current AP and has detected or discovered the presence of another AP adapted for carrying out FT procedures in accordance with embodiments described herein.

STA 520 may calculate a PTK using SNonce 561 and ANonce 560 or a value derived from ANonce (step 703a). For example, STA 520 may obtain a value of ANonce from a beacon signal broadcast by AP 541. Other implementations for obtaining a value of ANonce from target AP 541 may be suitably substituted. STA 520 may calculate the PTK using the SNonce and ANonce values, or in other implementations, the STA may use it's SNonce value and a derivative of the ANonce value (such as an incremented value of the ANonce). STA 520 generates and transmits a fast transition (FT) request message (FT Req) comprising an EAPOL-Key frame 705 to a target or candidate transition AP 541 that has previously been detected by STA 520 (step 710*a*). The request message may include SNonce, ANonce, and MIC values. EAPOL-Key frame 705 of the request message (or a portion thereof) may be protected by the calculated PTK. EAPOL-Key frame 705 may include various parameters or values to facilitate pre-authentication of STA 520. In the present example, EAPOL-Key frame 705 may include SNonce 561 generated or otherwise obtained by STA 520. SNonce 561 comprise a unique value of a set of values and may be used, along with other values, for generating a PTK security association (PTKSA). Additionally, EAPOL-Key frame 705 may additionally include a resource request, and the STA's RSN (STA RSN) information element. EAPOL-Key frame 705 may be encapsulated in one or more data structures, such as an information element having a header and one or more appended information elements. A header of EAPOL-Key frame or an encapsulating data structure may include an identifier, e.g., a MAC address, of STA 520 in a source address field. Additionally, the header may include the address of target transition AP 541 in a destination address field.

On receipt of EAPOL-Key frame 705, target transition AP 541 may validate the ANonce value read from the request message received in step 710*a*, compute a PTK using ANonce 560 obtained or generated by AP 541 and the SNonce value read from EAPOL-Key frame 705, and validate MIC read from EAPOL-Key frame 705 (step 712*a*). AP 541 may then store the STA RSN information element or content derived therefrom (step 714*a*). AP 541 may optionally evaluate a resource request read from (if included) EAPOL-Key frame 705 and may generate a resource response thereto that indicates whether AP 541 has the necessary capabilities and resources to support the needs of STA 520.

AP 541 then generates an FT response message comprising a MIC and EAPOL-Key frame 715 and sends the FT response message including EAPOL-Key frame 715 to STA 520 (step 720*a*). The FT EAPOL-Key frame 715 may include various parameters or values for facilitating authentication of STA 520. In the present example, EAPOL-Key frame 715 includes the AP's RSN information element (AP_RSN) from the APs Beacon or probe response messages or contents thereof. The FT response message may additionally include a resource response.

EAPOL-Key frame 715 may be encapsulated in one or more data structures, such as an information element having a header and one or more appended information elements. A header of EAPOL-Key frame 715 or an encapsulating data structure may include an identifier, e.g., a MAC address, of AP 541 in a source address field. Additionally, the header may include the address of STA 520 in a destination address field. Various other data may be included in EAPOL-Key frame 715 or an encapsulating data structure thereof as header or overhead data. For example, a reassociation deadline may be specified by AP 541 and included in a header or field of EAPOL-Key frame 715 or in an encapsulating data structure thereof. The reassociation deadline may specify a time allotted for STA 520 to initiate reassociation with AP 541. If the reassociation deadline expires prior to invocation of a reassociation procedure, STA 520 may be required to re-initiate the pre-key procedure if a fast transition is later to be performed.

On receipt of EAPOL-Key frame 715, STA 520 may check the AP_RSN value read therefrom and verify that the AP_RSN in EAPOL-Key frame 715 matches the AP-RSN information element obtained from the beacon signal of AP 541 (step 722*a*). Additionally, STA 520 may evaluate the resource response (if included) read from EAPOL-Key frame 715 to determine if AP 541 has suitable capacities and resources for transition thereto.

Advantageously, STA 520 and AP 541 have established PTKs for immediate resumption of data traffic subsequent to completing a reassociation. STA 520 may subsequently commence with a reassociation process within the interval defined by the reassociation deadline provided to STA 520 in EAPOL-Key frame 715.

STA 520 generates a reassociation request (Reassociation Req) 725 message including an identity or source address of STA 520 and an identity or destination address of AP 541 (step 726*a*). AP 541 may then generate a reassociation response (Reassociation Resp) 735 message including an identity or source address of AP 541 and an identity or destination address of STA 520 and transmit the reassociation response to STA 520 (step 730*a*). Secure communications may then be exchanged between STA 520 and AP 541 (step 734*a*).

Figure 7B:
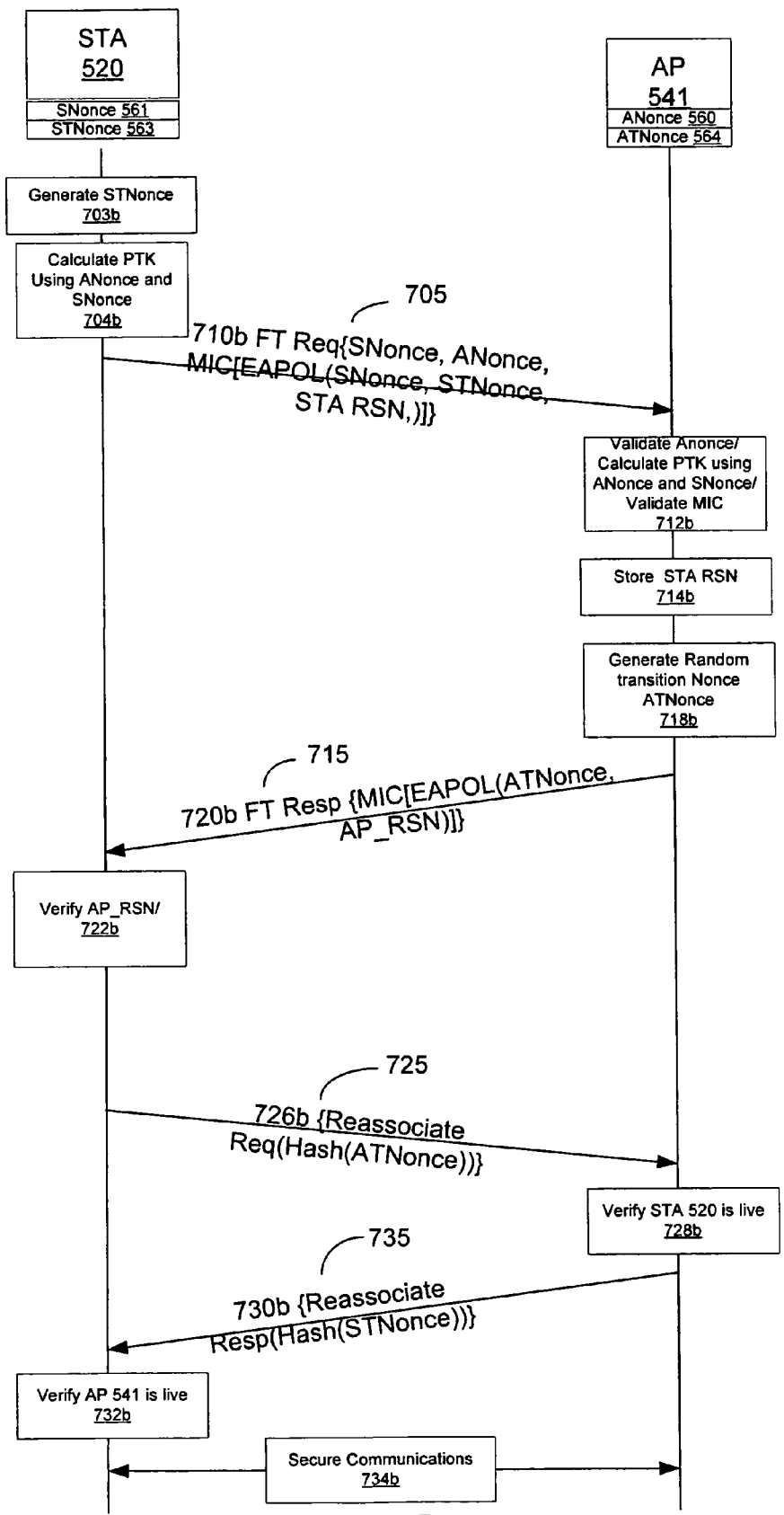
FIG. 7B is a diagrammatic representation of another embodiment of a signaling exchange between a mobile station and a candidate or target transition access point for performing a pre-key process on an over-the-air interface that facilitates fast BSS transition between a current access point and a target access point in a WLAN.

FIG. 7B is a diagrammatic representation of another embodiment of a signaling exchange 700 between a STA 520 and a candidate or target transition AP 541 for performing a pre-key process on an over-the-air interface that facilitates fast BSS transition between a current AP and a target AP in a WLAN. The signaling exchange depicted shows functional steps of a fast transition (FT) routine that facilitates fast transition of a station from a current AP to a candidate or target AP. The FT routine may be invoked by a STA when the STA is associated with a current AP and has detected or discovered the presence of another AP adapted for carrying out FT procedures in accordance with embodiments described herein.

STA 520 may obtain or generate a supplicant transition nonce (STNonce) 563 (step 703*b*). STA 520 may calculate a PTK using SNonce 561 and ANonce 560 or a value derived from ANonce (step 704*b*). For example, STA 520 may obtain a value of ANonce from a beacon signal broadcast by AP 541. Other implementations for obtaining a value of ANonce from target AP 541 may be suitably substituted. STA 520 may calculate the PTK using the SNonce and ANonce values, or in other implementations, the STA may use it's SNonce value and a derivative of the ANoncne value (such as an incremented value of the ANonce). STA 520 generates and transmits a fast transition (FT) request message (FT Req) that may include SNonce, ANonce, and MIC values and comprising an EAPOL-Key frame 705 to a target or candidate transition AP 541 that has previously been detected by STA 520 (step 710*b*). EAPOL-Key frame 705 may include various parameters or values to facilitate pre-authentication of STA 520. In the present example, EAPOL-Key frame 705 may include SNonce 561 generated or otherwise obtained by STA 520. SNonce 561 may be used, along with other values, for generating a PTK security association (PTKSA). Additionally, EAPOL-Key frame 705 may additionally include a resource request, the STA's RSN (STA RSN) information element, and STNonce 563. EAPOL-Key frame 705 may be encapsulated in one or more data structures, such as an information element having a header and one or more appended information elements. A header of EAPOL-Key frame or an encapsulating data structure may include an identifier, e.g., a MAC address, of STA 520 in a source address field. Additionally, the header may include the address of target transition AP 541 in a destination address field.

On receipt of EAPOL-Key frame 705, target transition AP 541 may validate the ANonce read from the request message received in step 710b compute a PTK using ANonce 560 obtained or generated by AP 541 and the SNonce value read from EAPOL-Key frame 705, and validate MIC read from EAPOL-Key frame 705 (step 712b). AP 541 may then store the STA RSN information element or content derived therefrom (step 714b). AP 541 may optionally evaluate a resource request read from (if included) EAPOL-Key frame 705 and may generate a resource response thereto that indicates whether AP 541 has the necessary capabilities and resources to support the needs of STA 520. A random transition nonce (ATNonce) that comprises a pseudo-randomly generated value may then be generated or obtained by AT 541 (step 718b).

AP 541 then generates an FT response message comprising a MIC and EAPOL-Key frame 715 and sends the FT response message including EAPOL-Key frame 715 to STA 520 (step 720b). EAPOL-Key frame 715 may include various parameters or values for facilitating authentication of STA 520. In the present example, EAPOL-Key frame 715 includes the ATNonce generated or obtained by AP 541, and the AP's RSN information element (AP_RSN) from the APs Beacon or probe response messages or contents thereof. The FT response message may additionally include a resource response.

EAPOL-Key frame 715 may be encapsulated in one or more data structures, such as an information element having a header and one or more appended information elements. A header of EAPOL-Key frame 715 or an encapsulating data structure may include an identifier, e.g., a MAC address, of AP 541 in a source address field. Additionally, the header may include the address of STA 520 in a destination address field. Various other data may be included in EAPOL-Key frame 715 or an encapsulating data structure thereof as header or overhead data. For example, a reassociation deadline may be specified by AP 541 and included in a header or field of EAPOL-Key frame 715 or in an encapsulating data structure thereof. The reassociation deadline may specify a time allotted for STA 520 to initiate reassociation with AP 541. If the reassociation deadline expires prior to invocation of a reassociation procedure, STA 520 may be required to re-initiate the pre-key procedure if a fast transition is later to be performed.

On receipt of EAPOL-Key frame 715, STA 520 may check the AP_RSN value read therefrom and verify that the AP_RSN in EAPOL-Key frame 715 matches the AP-RSN information element obtained from the beacon signal of AP 541 (step 722b). Additionally, STA 520 may evaluate the resource response (if included) read from EAPOL-Key frame 715 to determine if AP 541 has suitable capacities and resources for transition thereto. Advantageously, STA 520 and AP 541 have established PTKs for immediate resumption of data traffic subsequent to completing a reassociation. STA 520 may subsequently commence with a reassociation process within the interval defined by the reassociation deadline provided to STA 520 in EAPOL-Key frame 715.

STA 520 generates a reassociation request (Reassociation Req) 725 message including an identity or source address of STA 520 and an identity or destination address of AP 541 (step 726b). Additionally, reassociation request 725 may include a digest or hashed value of the ATNonce (or another value derived from the ATNonce) read by STA 520 from EAPOL-Key frame 715. Accordingly, on receipt of reassociation request 725, AP 541 may verify that STA 520 is live (that is, has a current PTK) by hashing ATNonce 564 and comparing it with the digest or hashed value read from reassociation request 725 (step 728b). In the event that STA 520 is verified as live by AP 541, AP 541 may then generate a reassociation response (Reassociation Resp) 735 message including an identity or source address of AP 541 and an identity or destination address of STA 520 and transmit the reassociation response to STA 520 (step 730b). Additionally, reassociation response 735 may include a digest or hashed value of the STNonce (or another value derived from the STNonce) read by AP 541 from EAPOL-Key frame 705. Accordingly, on receipt of reassociation response 735, STA 520 may verify that AP 541 is live by hashing STNonce 563 and comparing it with the digest or hashed value read from reassociation response 735 (step 732b). In the event that STA 520 verifies that AP 541 is live, secure communications may then be exchanged between STA 520 and AP 541 (step 734b).

Thus, pre-keying is performed prior to invocation of reassociation in accordance with embodiments herein. The pre-keying process is advantageously performed before movement or invocation of process to facilitate movement of the mobile station from a current AP to a transition AP. Thus, processing duration involved in obtaining keys is advantageously excluded from the transition duration.

While FIGS. 7A and 7B shows message exchanges for performing a fast transition by message exchanges between a STA and a target transition AP, such a configuration is illustrative only and is intended only to facilitate an understanding of the invention. For example, an embodiment of the fast transition may be performed with similar message exchanges carried out over DS 530 with only minor modifications. In one implementation, each of EAPOL-key frame 705, EAPOL-Key frame 715, reassociation request 725, and reassociation response 735 are encapsulated in respective frames, e.g., Action frames, that include a target AP field. In this instance, the identity or address of target transition AP 541 may be included in the target AP field of each respective encapsulating frame. Moreover, in a preferred embodiment, the mobile station may elect to perform the pre-keying process over the air interface or by way of the DS.

Figure 7C:
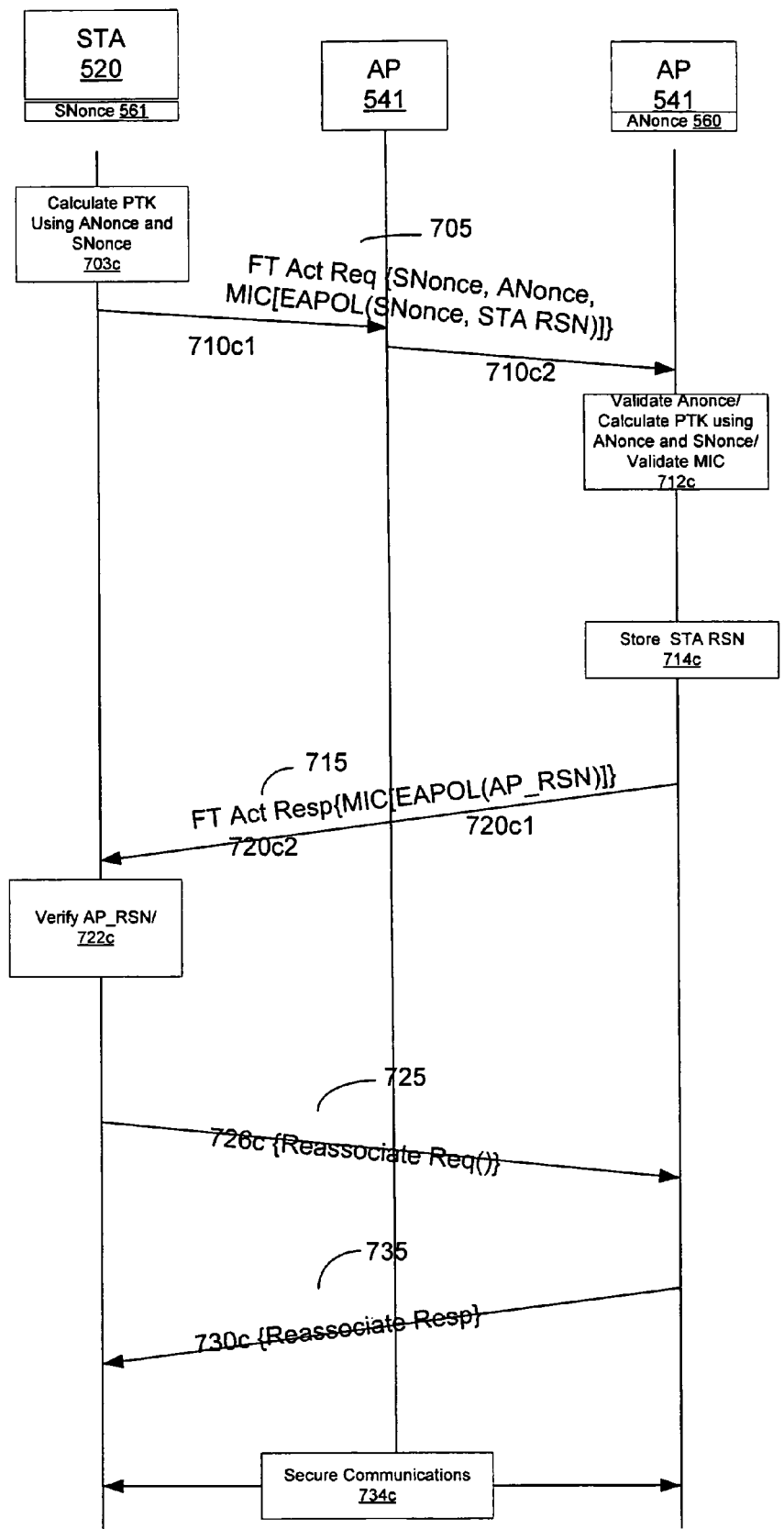
FIG. 7C is a diagrammatic representation of an embodiment of a signaling exchange 700 between a STA 520 and a candidate or target transition AP 541 for performing a pre-key process on a DS interface that facilitates fast BSS transition between a current AP and a target AP in a WLAN.

FIG. 7C is a diagrammatic representation of an embodiment of a signaling exchange 700 between a STA 520 and a candidate or target transition AP 541 for performing a pre-key process on a DS interface that facilitates fast BSS transition between a current AP and a target AP in a WLAN. The signaling exchange depicted shows functional steps of a fast transition (FT) routine that facilitates fast transition of a station from a current AP to a candidate or target AP. The FT routine may be invoked by a STA when the STA is associated with a current AP and has detected or discovered the presence of another AP adapted for carrying out FT procedures in accordance with embodiments described herein.

STA 520 may calculate a PTK using SNonce 561 and ANonce 560 or a value derived from ANonce (step 703c). For example, STA 520 may obtain a value of ANonce from a beacon signal broadcast by AP 541. Other implementations for obtaining a value of ANonce from target AP 541 may be suitably substituted. STA 520 may calculate the PTK using the SNonce and ANonce values, or in other implementations, the STA may use it's SNonce value and a derivative of the ANoncne value (such as an incremented value of the ANonce). STA 520 generates and transmits a FT Action Request (Act Req) comprising an EAPOL-Key frame 705c to a target or candidate transition AP 541 that has previously been detected by STA 520 (step 710c1 and c2) by way of current AP 540. The Action Request may include SNonce, ANonce, and MIC values and EAPOL-Key frame 705. EAPOL-Key frame 705 (or a portion thereof) may be protected by the calculated PTK. EAPOL-Key frame 705 may include various parameters or values to facilitate pre-authentication of STA 520. In the present example, EAPOL-Key frame 705 may include SNonce 561 generated or otherwise obtained by STA 520. SNonce 561 comprise a unique value of a set of values and may be used, along with other values, for generating a PTK security association (PTKSA). Additionally, EAPOL-Key frame 705 may additionally include a resource request, and the STA's RSN (STA RSN) information element. EAPOL-Key frame 705 may be encapsulated in one or more data structures, such as an information element having a header and one or more appended information elements. A header of EAPOL-Key frame or an encapsulating data structure may include an identifier, e.g., a MAC address, of STA 520 in a source address field. Additionally, the header may include the address of target transition AP 541 in a destination address field.

On receipt of EAPOL-Key frame 705, target transition AP 541 may validate the ANonce read from the request message received in step 710c2, compute a PTK using ANonce 560 obtained or generated by AP 541 and the SNonce value read from EAPOL-Key frame 705, and validate MIC read from EAPOL-Key frame 705 (step 712c). AP 541 may then store the STA RSN information element or content derived therefrom (step 714c). AP 541 may optionally evaluate a resource request read from (if included) EAPOL-Key frame 705 and may generate a resource response thereto that indicates whether AP 541 has the necessary capabilities and resources to support the needs of STA 520.

AP 541 then generates an FT Action Response (Act Resp) message comprising a MIC and an EAPOL-Key frame 715 and sends the Action Response message including EAPOL-Key frame 715 to STA 520 (steps 720c1 and 720c2) by way of current AP 540. EAPOL-Key frame 715 may include various parameters or values for facilitating authentication of STA 520. In the present example, EAPOL-Key frame 715 includes the AP's RSN information element (AP_RSN) from the APs Beacon or probe response messages or contents thereof. The FT response message may additionally include a resource response.

EAPOL-Key frame 715 may be encapsulated in one or more data structures, such as an information element having a header and one or more appended information elements. A header of EAPOL-Key frame 715 or an encapsulating data structure may include an identifier, e.g., a MAC address, of AP 541 in a source address field. Additionally, the header may include the address of STA 520 in a destination address field. Various other data may be included in EAPOL-Key frame 715 or an encapsulating data structure thereof as header or overhead data. For example, a reassociation deadline may be specified by AP 541 and included in a header or field of EAPOL-Key frame 715 or in an encapsulating data structure thereof. The reassociation deadline may specify a time allotted for STA 520 to initiate reassociation with AP 541. If the reassociation deadline expires prior to invocation of a reassociation procedure, STA 520 may be required to re-initiate the pre-key procedure if a fast transition is later to be performed.

On receipt of EAPOL-Key frame 715, STA 520 may check the AP_RSN value read therefrom and verify that the AP_RSN in EAPOL-Key frame 715 matches the AP-RSN information element obtained from the beacon signal of AP 541 (step 722c). Additionally, STA 520 may evaluate the resource response (if included) read from EAPOL-Key frame 715 to determine if AP 541 has suitable capacities and resources for transition thereto.

Advantageously, STA 520 and AP 541 have established PTKs for immediate resumption of data traffic subsequent to completing a reassociation. STA 520 may subsequently commence with a reassociation process within the interval defined by the reassociation deadline provided to STA 520 in EAPOL-Key frame 715.

STA 520 generates a reassociation request (Reassociation Req) 725 message including an identity or source address of STA 520 and an identity or destination address of AP 541 (step 726c). AP 541 may then generate a reassociation response (Reassociation Resp) 735 message including an identity or source address of AP 541 and an identity or destination address of STA 520 and transmit the reassociation response to STA 520 (step 730c). Secure communications may then be exchanged between STA 520 and AP 541 (step 734c).

Figure 7D:
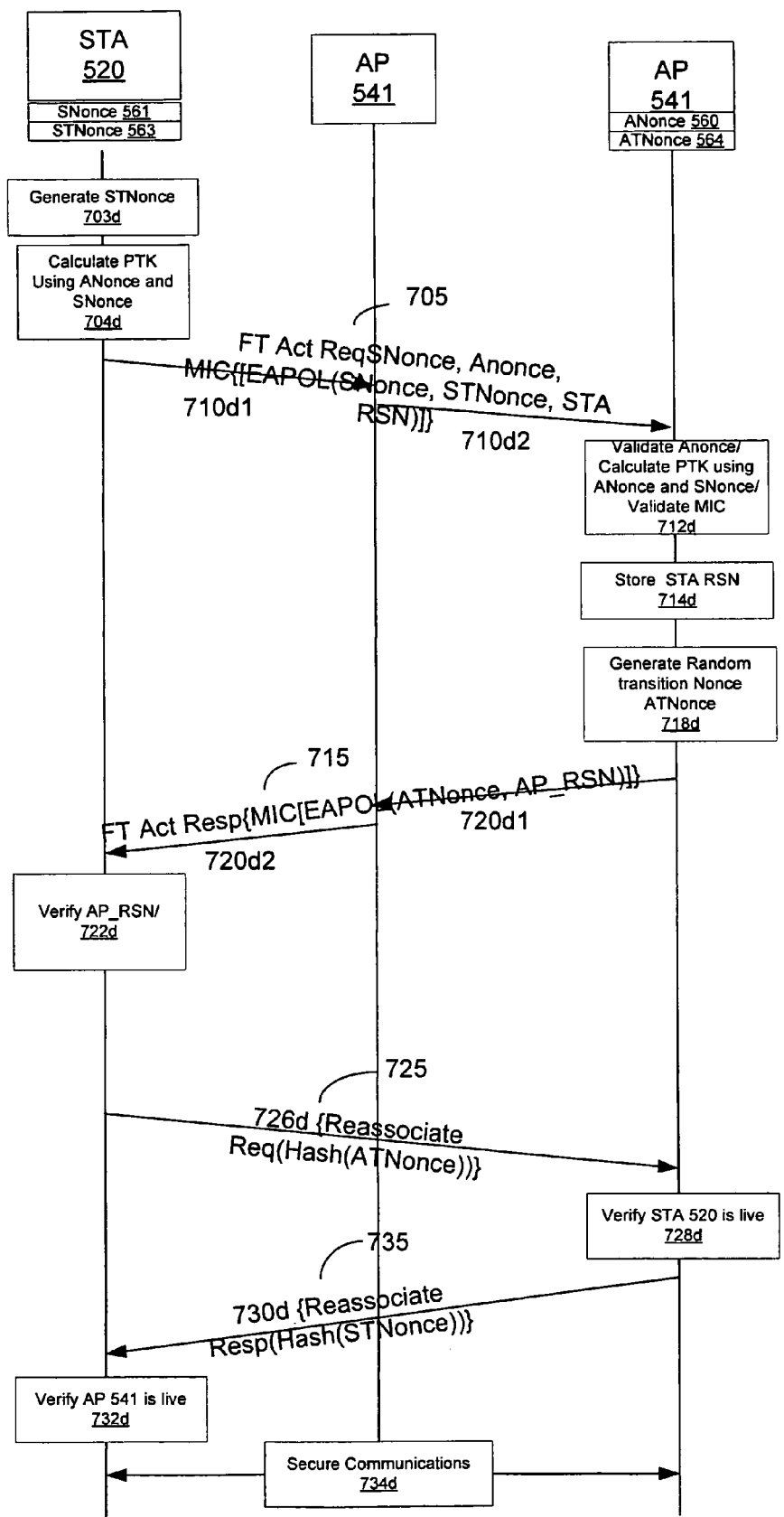
FIG. 7D is a diagrammatic representation of another embodiment of a signaling exchange between a mobile station and a candidate or target transition access point for performing a pre-key process on a DS interface that facilitates fast BSS transition between a current access point and a target access point in a WLAN.

FIG. 7D is a diagrammatic representation of another embodiment of a signaling exchange 700 between a STA 520 and a candidate or target transition AP 541 for performing a pre-key process on a DS interface that facilitates fast BSS transition between a current AP and a target AP in a WLAN. The signaling exchange depicted shows functional steps of a fast transition (FT) routine that facilitates fast transition of a station from a current AP to a candidate or target AP. The FT routine may be invoked by a STA when the STA is associated with a current AP and has detected or discovered the presence of another AP adapted for carrying out FT procedures in accordance with embodiments described herein.

STA 520 may obtain or generate a supplicant transition nonce (STNonce) 563 (step 703d). STA 520 may calculate a PTK using SNonce 561 and ANonce 560 or a value derived from ANonce (step 704d). For example, STA 520 may obtain a value of ANonce from a beacon signal broadcast by AP 541. Other implementations for obtaining a value of ANonce from target AP 541 may be suitably substituted. STA 520 may calculate the PTK using the SNonce and ANonce values, or in other implementations, the STA may use it's SNonce value and a derivative of the ANoncne value (such as an incremented value of the ANonce). STA 520 generates and transmits a FT Action message comprising an EAPOL-Key frame 705 to a target or candidate transition AP 541 that has previously been detected by STA 520 (step 710d1 and d2) by way of current AP 540. The Action Request may include SNonce, ANonce, and MIC values and EAPOL-Key frame 705. EAPOL-Key frame 705 may include various parameters or values to facilitate pre-authentication of STA 520. In the present example, EAPOL-Key frame 705 may include SNonce 561 generated or otherwise obtained by STA 520. SNonce 561 may be used, along with other values, for generating a PTK security association (PTKSA). Additionally, EAPOL-Key frame 705 may additionally include a resource request, the STA's RSN (STA RSN) information element, and STNonce 563. EAPOL-Key frame 705 may be encapsulated in one or more data structures, such as an information element having a header and one or more appended information elements. A header of EAPOL-Key frame or an encapsulating data structure may include an identifier, e.g., a MAC address, of STA 520 in a source address field. Additionally, the header may include the address of target transition AP 541 in a destination address field.

On receipt of EAPOL-Key frame 705, target transition AP 541 may validate the ANonce read from the request message received in step 710d2, compute a PTK using ANonce 560 obtained or generated by AP 541 that comprises a pseudo-randomly generated value and the SNonce value read from EAPOL-Key frame 705, and validate MIC read from EAPOL-Key frame 705 (step 712d). AP 541 may then store the STA RSN information element or content derived therefrom (step 714d). AP 541 may optionally evaluate a resource request read from (if included) EAPOL-Key frame 705 and may generate a resource response thereto that indicates whether AP 541 has the necessary capabilities and resources to support the needs of STA 520. A random transition nonce (ATNonce) that comprises a pseudo-randomly generated value may then be generated or obtained by AT 541 (step 718d).

AP 541 then generates an FT Action response message comprising a MIC and EAPOL-Key frame 715 and sends the Action response message including EAPOL-Key frame 715 to STA 520 (steps 720d1 and 720d2) by way of current AP 540. EAPOL-Key frame 715 may include various parameters or values for facilitating authentication of STA 520. In the present example, EAPOL-Key frame 715 includes the ATNonce generated or obtained by AP 541, and the AP's RSN information element (AP_RSN) from the APs Beacon or probe response messages or contents thereof. The FT response message may additionally include a resource response.

EAPOL-Key frame 715 may be encapsulated in one or more data structures, such as an information element having a header and one or more appended information elements. A header of EAPOL-Key frame 715 or an encapsulating data structure may include an identifier, e.g., a MAC address, of AP 541 in a source address field. Additionally, the header may include the address of STA 520 in a destination address field. Various other data may be included in EAPOL-Key frame 715 or an encapsulating data structure thereof as header or overhead data. For example, a reassociation deadline may be specified by AP 541 and included in a header or field of EAPOL-Key frame 715 or in an encapsulating data structure thereof. The reassociation deadline may specify a time allotted for STA 520 to initiate reassociation with AP 541. If the reassociation deadline expires prior to invocation of a reassociation procedure, STA 520 may be required to re-initiate the pre-key procedure if a fast transition is later to be performed.

On receipt of EAPOL-Key frame 715, STA 520 may check the AP_RSN value read therefrom and verify that the AP_RSN in EAPOL-Key frame 715 matches the AP-RSN information element obtained from the beacon signal of AP 541 (step 722d). Additionally, STA 520 may evaluate the resource response (if included) read from EAPOL-Key frame 715 to determine if AP 541 has suitable capacities and resources for transition thereto. Advantageously, STA 520 and AP 541 have established PTKs for immediate resumption of data traffic subsequent to completing a reassociation. STA 520 may subsequently commence with a reassociation process within the interval defined by the reassociation deadline provided to STA 520 in EAPOL-Key frame 715.

STA 520 generates a reassociation request (Reassociation Req) 725 message including an identity or source address of STA 520 and an identity or destination address of AP 541 (step 726d). Additionally, reassociation request 725 may include a digest or hashed value of the ATNonce (or another value derived from the ATNonce) read by STA 520 from EAPOL-Key frame 715. Accordingly, on receipt of reassociation request 725, AP 541 may verify that STA 520 is live (that is, has a current PTK) by hashing ATNonce 564 and comparing it with the digest or hashed value read from reassociation request 725 (step 728d). In the event that STA 520 is verified as live by AP 541, AP 541 may then generate a reassociation response (Reassociation Resp) 735 message including an identity or source address of AP 541 and an identity or destination address of STA 520 and transmit the reassociation response to STA 520 (step 730d). Additionally, reassociation response 735 may include a digest or hashed value of the STNonce (or another value derived from the STNonce) read by AP 541 from EAPOL-Key frame 705. Accordingly, on receipt of reassociation response 735, STA 520 may verify that AP 541 is live by hashing STNonce 563 and comparing it with the digest or hashed value read from reassociation response 735 (step 732b). In the event that STA 520 verifies that AP 541 is live, secure communications may then be exchanged between STA 520 and AP 541 (step 734d).

In the implementations described in FIGS. 7C and 7D, the pre-keying is performed prior to invocation of reassociation and thus advantageously performed before movement or invocation of processes that facilitate movement of the mobile station from a current AP to a transition AP. Accordingly, a processing duration involved in obtaining keys is advantageously excluded from the transition duration. Moreover, mechanisms are provided for performing the pre-keying processes over an air interface directly with a transition AP or by way of the DS. In a preferred embodiment, the mobile station may elect to perform the pre-keying process over the air interface or over the DS.

Figure 8:
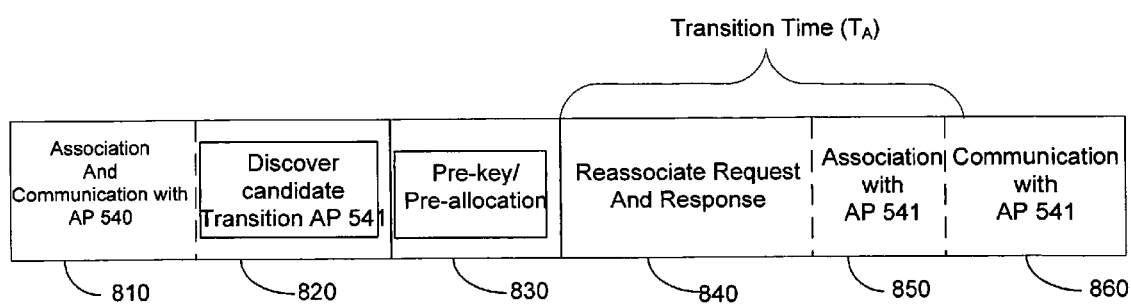
FIG. 8 is a diagrammatic representation of message timing for a fast transition procedure implemented in accordance with embodiments of the present invention.

FIG. 8 is a diagrammatic illustration of message timing for a fast transition procedure implemented in accordance with embodiments described herein. STA 520 is associated and communicatively coupled with AP 540 (step 810). STA 520 may then discover a candidate or potential transition AP 541 with which STA 520 may elect to attempt a transition (step 820). A pre-key process is then invoked by STA 520 (step 830). Subsequently, a reassociation process including transmission of a reassociation request from STA 520 to candidate transition AP 541 and a reassociation response message transmitted from AP 541 to STA 520 is performed (step 840). STA 520 is then associated with AP 541 (step 850), and may then commence in secure communications with AP 541. Advantageously, the transition time consumed for handover of communications from AP 540 to AP 541 excludes the duration of the pre-key process performed for obtaining PTKs.

Embodiments described herein reduce the transition duration by a pre-keying mechanism that performs authentication procedures prior to commencement of reassociation procedures. Thus, transition times are advantageously shortened, and improved communication services may be realized for STAs that roam in a WLAN.

The previous descriptions are of preferred examples for implementing the invention, and the scope of the invention should not necessarily be limited by this description. The scope of the present invention is defined by the following claims.

We claim:

1. A method comprising:

discovering, by a mobile device, a second access point while communicatively associated with a first access point;

obtaining a first pseudo-random value and a second pseudo-random value, wherein at least one of the first pseudo-random value and the second pseudo-random value is provided by the second access point;

generating a data structure that defines a resource request for a fast transition in a pre-keying process, wherein the first pseudo-random value and the second pseudo-random value are included in the data structure, wherein the resource request relates to whether the second access point has capabilities and resources to support needs of the mobile device;

transmitting the data structure to the second access point in the pre-keying process;

determining, after the pre-keying process is completed, whether to invoke a reassociation procedure based on a first resource response to the data structure, wherein the first resource response indicates whether the second access point has the capabilities and resources to support the needs of the mobile device.

2. The method of claim 1, further comprising calculating a first key based on the second pseudo-random value and a third pseudo-random value read from the first resource response.

3. The method of claim 2, further comprising:
generating a reassociation request subsequent to calculation of the first key, wherein the reassociation request includes a value derived from the third pseudo-random value; and
transmitting the reassociation request to the second access point.

4. The method of claim 3, wherein the value derived from the third pseudo-random value comprises a hash of the third pseudo-random value.

5. The method of claim 2, wherein the first pseudo-random value comprises a supplicant transition nonce value, and wherein the second pseudo-random value comprises an authentication transition nonce value.

6. The method of claim 1, further comprising:
receiving a reassociation response message in response to an reassociation request; and
verifying that the second access point has a current key based on contents of the reassociation response message.

7. The method of claim 1, further comprising selecting performance of the pre-keying process through over the air communications or via a distribution system.

8. A method comprising:
receiving, by a second access point, a data structure that defines a resource request for a fast transition in a pre-keying process, wherein a first pseudo-random value and a second pseudo-random value are included in the data structure, wherein at least one of the first pseudo-random value and the second pseudo-random value is provided by the second access point, wherein the resource request relates to whether the second access point has capabilities and resources to support needs of a mobile station;
generating a resource response which indicates whether the second access point has the capabilities and resources to support the needs of the mobile station in the pre-keying process;
transmitting the resource response to the mobile station; and
after the pre-keying process is completed, receiving a reassociation request from the mobile station.

9. The method of claim 8, further comprising:
receiving a reassociation request that includes a value derived from a third pseudo-random value; and
verifying that the mobile station has a current key based on the value derived from the third pseudo-random value, wherein the value derived from the third pseudo-random value comprises a hash of the third pseudo-random value.

10. A non-transitory computer-readable medium having computer-executable instructions for execution by a processing system, the computer-executable instructions for facilitating a fast transition in a network system, comprising:
instructions to discover a second access point while communicatively associated with a first access point;
instructions to obtain a first pseudo-random value and a second pseudo-random value, wherein at least one of the first pseudo-random value and the second pseudo-random value is provided by the second access point;
instructions to generate a data structure that defines a resource request for a fast transition in a pre-keying process, wherein the first pseudo-random value and the second pseudo-random value are included in the data structure, wherein the resource request relates to whether the second access point has capabilities and resources to support needs of the mobile device;
instructions to generate the data structure to the access point in the pre-keying process;
instructions to determine, after the pre-keying process is completed, whether to invoke a reassociation procedure with the access point based on a first resource response to the data structure, wherein the resource response message indicates whether the second access point has the capabilities and resources to support the needs of the mobile device.

11. The non-transitory computer-readable medium of claim 10, further comprising instructions to calculate a key based on the second pseudo-random value and a third pseudo-random value read from the first resource response.

12. The non-transitory computer-readable medium of claim 11, further comprising:
instructions to generate a reassociation request subsequent to calculation of the key, wherein the reassociation request includes a value derived from the third pseudo-random value; and
instructions to transmit the reassociation request to the second access point.

13. The non-transitory computer-readable medium of claim 12, wherein the value derived from the third pseudo-random value comprises a hash of the third pseudo-random value.

14. The non-transitory computer-readable medium of claim 12, further comprising:
instructions to receive a reassociation response message; and
instructions to verify the second access point has a current key based on contents of the reassociation response message.

15. The non-transitory computer-readable medium of claim 12, wherein the first pseudo-random value comprises a supplicant transition nonce value, and wherein the second pseudo-random value comprises an authentication transition nonce value.

16. The non-transitory computer-readable medium of claim 10, further comprising instructions that release a radio link with the first access point subsequent to a determination being made to invoke a reassociation procedure.

17. A non-transitory computer-readable medium having computer-executable instructions for execution by a processing system, the computer-executable instructions for facilitating a fast transition in a network system, comprising:
instructions to receive a data structure that defines a resource request for a fast transition in a pre-keying process, wherein a first pseudo-random value and a second pseudo-random value are included in the data structure, wherein the resource request relates to whether a second access point has capabilities and resources to support needs of a mobile station associated with a first access point, wherein at least one of the first pseudo-random value and second pseudo-random value is provided by the second access point;

instructions to generate a resource response, in the pre-keying process, which indicates whether the second access point has the capabilities and resources to support needs of the mobile station;
instructions to transmit the resource response to the mobile station; and
instructions to receive, after the pre-keying process is completed, a reassociation request from the mobile station.

18. The non-transitory computer-readable medium of claim 17, further comprising:
instructions to receive a reassociation request that includes a value derived from a third pseudo-random value; and
instructions to verify that the mobile station has a current key based on the value derived from the third pseudo-random key.

19. An apparatus comprising:
a transmitter;
a receiver;
a processor configured to communicate with an access point through the transmitter and the receiver; and
a memory configured to store computer-executable instructions for execution by the processor, the computer-executable instructions for facilitating a fast transition in a network system,
the processor is configured to discover a second access point while communicatively associated with a first access point, obtain a first pseudo-random value and a second pseudo-random value, wherein at least one of the first pseudo-random value and second pseudo-random value is provided by the second access point, and generate a data structure that defines a resource request for a fast transition in a pre-keying process, wherein the first pseudo-random value and the second pseudo-random value are included in the data structure, wherein the resource request relates to whether the second access point has capabilities and resources to support needs of the apparatus,
the transmitter is configured to transmit the data structure to the access point in the pre-keying process,
the processor is configured to determine, after the pre-keying process is completed, whether to invoke a reassociation procedure with the second access point based on a first resource response to the data structure, wherein the first resource response indicates whether the second access point has the capabilities and resources to support the needs of the apparatus.

20. The apparatus of claim 19, the processor further configured to calculate a key based on the second pseudo-random value and a third pseudo-random value read from the first resource response.

21. The apparatus of claim 19, the memory further configured to store instructions that, when executed by the processor, release a radio link with the first access point subsequent to a determination being made to invoke a reassociation procedure.

22. The apparatus of claim 19, wherein the first resource response comprises a reassociation deadline for initiating the reassociation procedure by said apparatus.

23. An apparatus comprising:
a transmitter;
a receiver;
a processor configured to communicate with a mobile station through the transmitter and the receiver, the processor configured to obtain a first pseudo-random value and a second pseudo-random value; and
a memory configured to store computer-executable instructions for execution by the processor, the computer-executable instructions for facilitating a fast transition in a network system,
the processor is configured to receive through the receiver a data structure that defines a resource request for a fast transition in a pre-keying process, wherein the data structure includes the first pseudo-random value and the second pseudo-random value, wherein at least one of the first pseudo-random value and second pseudo-random value is provided by the apparatus, wherein the resource request relates to whether the apparatus has capabilities and resources to support needs of the mobile station communicatively associated with a first access point;
generate a resource response which indicates whether the apparatus has the capabilities and resources to support the needs of the mobile station,
the transmitter is configured to transmit the resource response to the mobile station in the pre-keying process, and
the receiver is configured, after the pre-keying process is completed, to receive a reassociation request from the mobile station.

24. The apparatus of claim 23, wherein the processor is further configured to receive a reassociation request that includes a value derived from a third pseudo-random value and verify that the apparatus has a current key based on the value derived from the third pseudo-random key.

25. The apparatus of claim 24, wherein the value derived from the third pseudo-random value comprises a hash of the third pseudo-random value.)

26. The apparatus of claim 23, wherein the resource response comprises a reassociation deadline for initiating the reassociation procedure by said mobile station.

* * * * *